July 23, 1957 M. E. SCHNURR ET AL 2,800,111
SURGE RELIEF AND BY-PASS VALVE
Filed Jan. 4, 1956 2 Sheets-Sheet 1

INVENTORS
MURRAY E. SCHNURR
CLIFFORD E. WILLIS
BY
ATTORNEYS

July 23, 1957　　M. E. SCHNURR ET AL　　2,800,111

SURGE RELIEF AND BY-PASS VALVE

Filed Jan. 4, 1956　　　　　　　　　　　　2 Sheets-Sheet 2

INVENTORS
MURRAY E. SCHNURR
CLIFFORD E. WILLIS
BY

ATTORNEYS

2,800,111

SURGE RELIEF AND BY-PASS VALVE

Murray E. Schnurr, Kalamazoo Township, Kalamazoo County, and Clifford E. Willis, Kalamazoo, Mich., assignors, by mesne assignments, to The Cleveland Pneumatic Tool Company, Cleveland, Ohio, a corporation of Ohio Application January 4, 1956, Serial No. 557,409

6 Claims. (Cl. 121—38)

This invention relates in general to a pressure relief valve and, more specifically, to a type thereof which may be connected between zones of different pressures in a pressure actuated power translating device to bypass pressure fluid from one zone of said device to the other whenever a pressure differential of a preselectable value occurs between said zones.

In the designing of a hydraulic system wherein multiple, usually independent, pressure sources are connected through a pair of independently connected translating devices to a single load, there arises a serious problem of providing proper synchronization between the control devices normally utilized for controlling the supply from the multiple pressure sources to the translating devices. Failure to provide such synchronization may, and often does, under reasonably frequent operating conditions, lead to extreme pressure surges in at least one of the translating devices, which pressure surges may be great enough to seriously injure, or even destroy, the equipment.

For example, where a pair of pressure fluid actuated power cylinders are interconnected, as in tandem, and are in turn connected to a single load, and said power cylinders are supplied with pressure fluid through a pair of valves wherein each valve is located in the hydraulic circuit from one of two sources of pressure fluid to one of said cylinders, there arises a necessity for synchronizing the operation of said valves with extreme exactness. Failure to effect such exact synchronization will often result in pressure surges within one of the pressure zones of at least one of said power cylinders.

Since exact synchronization is with many types of equipment at best very difficult to attain, one expedient for preventing injury to the apparatus by the occurrence of such pressure surges is the provision of a suitable relief valve between the respective pressure zones of each of said translating devices.

However, in the provision of such relief valves, a further problem arises from the fact that both of such zones, such as both ends of a power cylinder, may normally, though alternately, receive a high pressure, and the surge may conceivably occur within either zone of any of the several translating devices. Thus, any effective relief valve must be capable of working equally effectively in either direction.

As the description proceeds, it will be recognized that the problem here dealt with is of wide application in a variety of situations where pressure fluids are used to effect mechanical movements and the relief valve of the present invention is accordingly capable of wide application. However, it is particularly applicable for use with a pair of mechanically connected cylinders controlled by a pair of interconnected valves and thus, for purposes of illustration, the description will proceed with specific reference thereto. It should be borne in mind, however, that the utilization of the particular apparatus hereinafter expressly mentioned is for the purpose of illustration only and is in no sense limiting.

One well known application of a construction utilizing multiple, coupled power cylinders is in connection with a servo unit, which is used as a booster device in the operation of the airfoil surface controls of an aircraft. The purpose of the multiple source of pressure fluid is to avoid the complete loss of control over said airfoil surfaces which would otherwise occur if one system fails mechanically or is put out of service by battle damage.

Accordingly, a primary object of this invention is the provision of a pressure relief and by-pass valve which will relieve pressure surges in a pressure fluid system having multiple, mechanically interconnected, power translating devices, such as that found in certain types of servo mechanisms, which surges would otherwise result, for example, from faulty synchronization of the valves which control the flow of pressure fluid to said power translating devices.

A further object of this invention is the provision of a pressure relief valve, as aforesaid, which can overcome surge pressures by by-passing pressure fluid from that zone of the power translating device in which a pressure surge is occurring to a zone of lower pressure.

A further object of this invention is the provision of a pressure relief valve, as aforesaid, which is compact in size, positive in operation, and is suitable for use under high pressure conditions.

Other objects and purposes of this invention will become apparent to persons familiar with this type of equipment upon reading the following specification and examining the accompanying drawings, in which.

Figure 1:
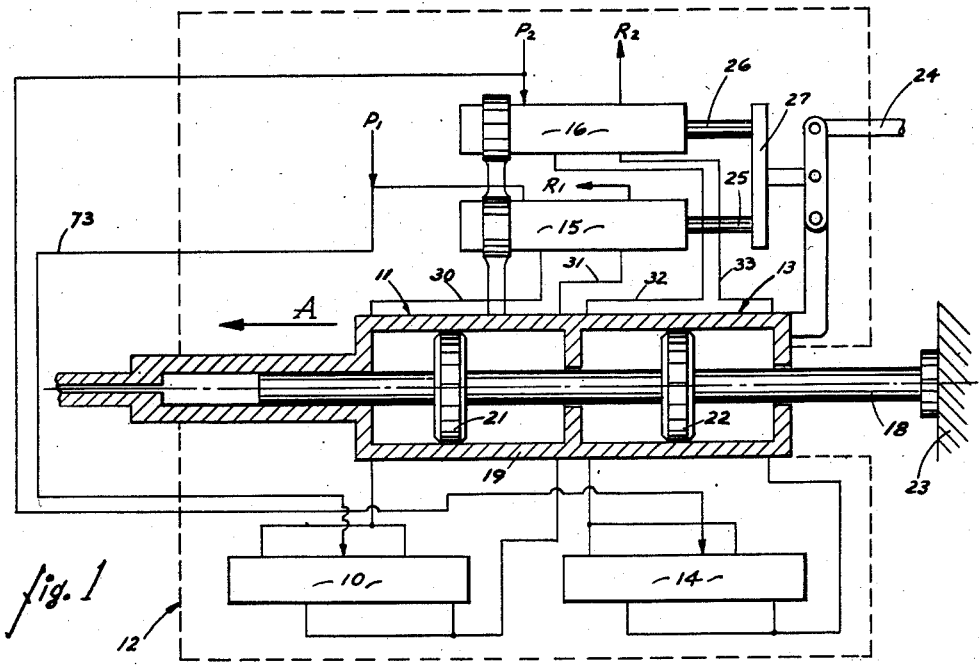
Figure 1 is a diagrammatic view of a servo mechanism, including a pair of centrally cross-sectioned, tandem power cylinders, each connected to a separate pressure relief valve of the type to which this invention relates and also illustrating a pair of valves for controlling flow of pressure fluid to the power cylinders.
Figure 2:
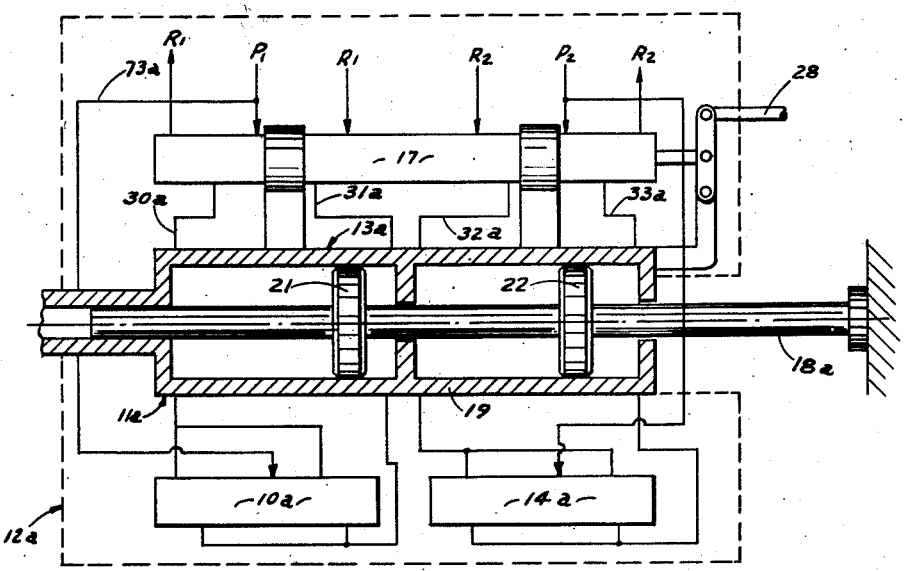
Figure 2 is a diagrammatic view of a servo mechanism similar to that shown in Figure 1, except that there is shown a single, in-line valve for controlling the flow of pressure fluid to the power cylinders.
Figure 3:
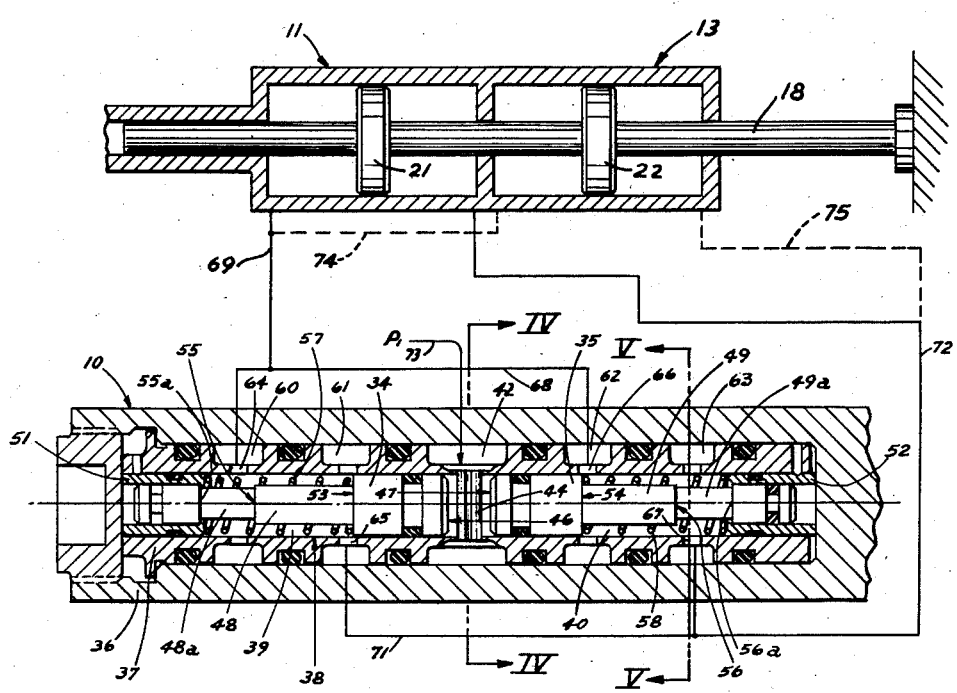
Figure 3 is a central, cross-sectional view of a pair of tandem power cylinders in combination with a pressure relief valve operably connected to one of said cylinders.

For the purpose of convenience in description, the terms "leftward," "rightward," and derivatives thereof, will have reference to the pressure relief valve to which this invention relates and the parts associated therewith, as appearing in Figures 1, 2 and 3. The terms "inner," "outer," and derivatives thereof, will have reference to the geometric center of said pressure relief valve and parts associated therewith.

GENERAL DESCRIPTION

In order to meet the objects and purposes set forth above, we have provided a surge relief and by-pass valve 10 (Figures 1 and 3), which is operably connected to the power cylinder 11 in the servo mechanism 12. In this particular embodiment, there are two tandem connected power cylinders 11 and 13 and two identical relief valves 10 and 14, one for each of said power cylinders, respectively. The flow of pressure fluid to the power cylinders 11 and 13 may be controlled either by separate control valves 15 and 16 (Figure 1) or by a single, in-line control valve 17 (Figure 2). For purposes of illustration, the servo mechanism 12 (Figure 1) and the modified servo mechanism 12a (Figure 2) are disclosed herein as being of the type wherein the common piston rod 18 of the power cylinders 11 and 13 is anchored and the housing 19 of said power cylinders 11 and 13 is movable in response to operation of the fluid control valves 15 and 16 in unison or to the control valve 17, as the case may be. This particular arrangement of the servo mechanism will be understood as illustrative only and not limiting. Reference numerals similar to those used in Figure 1 but with the suffix "a" added thereto are used in Figure 2 to designate parts in Figure 2 corresponding to similar parts in Figure 1.

*Detailed construction*

As shown in Figures 1 and 3, the relief valves 10 and 14, which are identical, may be utilized, as illustrated, with multiple, coupled, power translating devices, such as the power cylinders 11 and 13 of a conventional servo mechanism 12. In this particular illustration, the power cylinders 11 and 13 are combined in a single housing and have a common piston rod 18 upon which their respective pistons 21 and 22 are mounted. The piston rod 18 may be anchored to means 23, such as the frame of an aircraft. The housing 19 may be connected in a conventional manner to load means, not shown, such as the control surfaces of said aircraft. The fluid control valves 15 and 16 (Figure 1) may be of a conventional type, such as those having axially movable, spool-type valve cores for directing the flow of pressure fluid into the power cylinders 11 and 13, respectively, in response to movement of an actuating bar 24 connected to the extended ends 25 and 26 of said valve cores by the crosshead 27. The servo mechanism 12a (Figure 2) differs from the servo mechanism 12 (Figure 1) in that the single, in-line control valve 17 performs the function of the two separate control valves 15 and 16 of the servo mechanism 12 (Figure 1). The in-line fluid control valve 17, which is actuated by the bar 28, is disclosed in detail in the co-pending application of Clifford E. Willis and John W. Meulendyk, Serial Number 552,210, filed December 9, 1955, entitled, "Control Device," and assigned to the same assignee as the present application.

Where two control valves 15 and 16 (Figure 1) are utilized in connection with a servo mechanism 12, pressure fluid from source $P_1$ is supplied to the fluid control valve 15, which, depending upon the position of the actuating bar 24, directs the pressure fluid to one end or the other of the power cylinder 11, either through the control conduit 30 or the control conduit 31. Pressure fluid is exhausted from the other end of said power cylinder 11 through that control conduit which is not carrying the pressure fluid, and is returned to the control valve 15, where it is directed to the return line $R_1$. In a similar manner, pressure fluid from source $P_2$ is directed by the control valve 16 through one of the control conduits 32 and 33, into the power cylinder 13, and exhaust fluid is returned therefrom to said control valve 16.

As stated above, the relief valves 10 and 14 may be, and preferably are, identical in structure and operation. Thus, a detailed description of the structure of the relief valve 10 (Figures 3, 4 and 5) will be given herein and such description will be understood to apply in substance to the relief valve 14.

Figure 4:
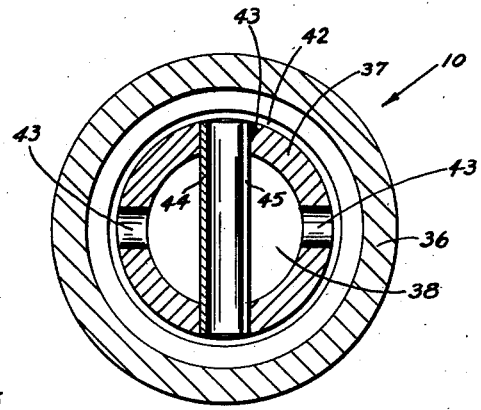
Figure 4 is a sectional view taken along the line IV—IV of Figure 3.
Figure 5:
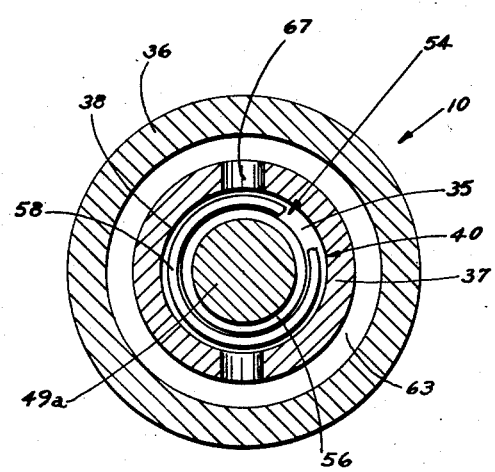
Figure 5 is a sectional view taken along the line V—V of Figure 3.

Said relief valve 10 (Figure 3) may be provided with a valve housing 36, which may be either independent of, or integral with, the housing 19 of the power cylinders 11 and 13. For convenience in fabrication, an elongated valve sleeve 37, having a lengthwise, preferably co-axial piston chamber 38 therein, is disposed within the valve housing 36. The chamber 38 is divided into leftward and rightward portions 39 and 40, which, in this particular embodiment, are substantially equal in size and identical in shape. The valve sleeve 37 has an annular groove 42 in the periphery thereof midway between the ends of said sleeve 37, hence at the meeting zone of the chamber portions 39 and 40. Four uniformly spaced and radially disposed openings 43 communicate between the groove 42 and the piston chamber 38 (Figure 4). A hollow stop member 44 is snugly disposed within, and extends between, a pair of diametrically opposed openings 43. Said member 44 is provided with a lengthwise slot 45 (Figure 4), which permits communication between the interior of said member 44, which is open at both ends thereof, and the piston chamber 38.

A pair of pistons 34 and 35, each of which has substantial axis length, are disposed respectively with the portions 39 and 40 of the chamber 38. Said pistons 34 and 35 have mutually facing surfaces 46 and 47, each of said surfaces being adjacent to the stop member 44, and each of which are substantially equal in area to the cross-sectional area of the piston chamber 38. Said pistons 34 and 35 also have piston rods 48 and 49, respectively, which extend out of, and away from, the release surfaces 53 and 54 of said pistons. The rods 48 and 49 are slidably disposed within, and arranged in fluid sealing relationship with, glands 51 and 52 which are located at the opposite respective ends of the valve sleeve 37. Portions 48a and 49a of reduced diameter may be provided, if desired, on each of the piston rods 48 and 49, respectively. The shoulders at each end of each of such portions will balance each other, that is, pressure fluid acting on shoulder 56 will balance that acting on shoulder 56a, and pressure fluid acting on shoulder 55 will balance that acting on shoulder 55a. Thus, the release surfaces 53 and 54 of the pistons 34 and 35 oppose the surfaces 46 and 47, respectively, and provide substantially less area within the chamber portions 39 and 40, perpendicular to the axis thereof, than do the surfaces 46 and 47 in this particular embodiment. The pistons 34 and 35 constantly are urged toward each other, hence toward the stop member 44, by means of a pair of spiral springs 57 and 58 which are sleeved upon the rods 48 and 49, respectively, between the glands 51 and 52 and the release surfaces 53 and 54, respectively.

The left and right ends of the valve sleeve 37 are each provided with a pair of substantially identical annular grooves 60 and 61, and 62 and 63, respectively. The grooves 60 and 61 are connected to the left portion 39 of the chamber 38 by ports 64 and 65, respectively. The grooves 62 and 63 are connected to the right portion 40 of the chamber 38 by the ports 66 and 67, respectively. The inner ports 65 and 66 are blocked by the pistons 34 and 35 in all positions of said pistons excepting only when said pistons are substantially against the stop member 44. The outer ports 64 and 67 are never obstructed by the pistons 34 and 35.

The outer port 64 (Figure 3) and the inner port 66 are connected through the annular grooves 60 and 62, respectively, by a by-pass conduit 68. The by-pass conduit 68 is connected, in turn, by a surge conduit 69 to the leftward end of the power cylinder 11, in this particular embodiment. The inner port 65 and the outer port 67 are connected through the annular grooves 61 and 63, respectively, by the by-pass conduit 71. Said by-pass conduit 71 is connected, in turn, by a surge conduit 72 to the rightward end of the power cylinder 11. The annular groove 42 is connected by a pressure conduit 73 directly to the same source $P_1$ of pressure fluid as that supplying the translating device 11.

In a similar manner, the relief valve 14, constructed similarly to the valve 10, is connected to the power cylinder 13 and the source $P_2$ of pressure fluid.

The construction of the relief valves 10a and 14a (Figure 2), used with a servo mechanism 12a and having an in-line type of fluid flow control valve 17, may be the same as above described in connection with the valves 10 and 14. For details of an in-line control valve 17 of the type contemplated herein, reference is made to the above mentioned co-pending application.

*Operation*

As indicated in the above description, the relief valves 10 and/or 14 may be used with a single power cylinder or with a plurality of coupled power cylinders. A separate pressure relief valve is, in the two particular embodiments shown, associated with each said power cylinder. Different control valve and relief valve assemblies are disclosed in Figures 1 and 2 primarily for the purpose of illustrating some of the problems which are encountered and which can be overcome by one or more of the pressure relief valves to which this invention relates.

Considering first the servo mechanism 12 shown in Figure 1, it will be observed that operation of the actuating bar 24, either leftwardly or rightwardly, will cause pressure fluid from the sources $P_1$ and $P_2$ to flow through the fluid pressure control valves 15 and 16, respectively, to the power cylinders 11 and 13, respectively, either through the control conduits 30 and 32 or through the control conduits 31 and 33. When two of said conduits, for example, conduits 30 and 32, are carrying pressure fluid from the pressure control valves 15 and 16 to corresponding ends of the power cylinders 11 and 13, the other pair of control conduits, the conduits 31 and 33, will be returning pressure fluid exhausting from the opposite ends of said power cylinders. When the pressure fluid is flowing through conduits 30 and 32, the power cylinder housing 19 will be moved leftwardly because the pistons 21 and 22 are mounted upon a piston rod 18 which is anchored at its rightward end, in this particular embodiment.

If the control valves 15 and 16 are not properly synchronized, or if the control valves 15 and 16 have suffered battle damage, such as having the return line 31 completely or partially blocked off, it is possible for pressure fluid to be directed through the control conduits 30 and 32 and return only through the conduit 33, thus trapping pressure fluid between the piston 21 and the rightward end of the power cylinder 11. Thus, the pressure within the power cylinder 11 on the rightward side of the piston 21 will be the result of the forces from pressures $P_1$ and $P_2$ on the leftward sides of both the pistons 21 and 22. As long as there are only the forces thus far mentioned operating in the particular tandem arrangement, such an accumulation of pressure in the power cylinder 11 may not be damaging. However, at the moment that this cumulative pressure occurs, it is not at all unlikely, particularly in the case of a servo mechanism used to operate a control surface of an aircraft, for a force to be applied to said control surface which urges the housing 19 in the same direction, i. e., leftwardly, in which said housing is being urged by said fluid. As a result, this additive force applied to said surface may greatly increase the pressure created within the right end of cylinder 11 by the pressures $P_1$ and $P_2$. This pressure surge may reach a magnitude several times the normal maximum operating pressure.

In order to render harmless such a surge condition in the power cylinder 11, the pressure relief valve 10 is connected to the opposite ends of the power cylinder 11 by the surge conduits 69 and 72.

Under normal conditions, the pressure fluid flowing from the source $P_1$ through the pressure conduit 73 into the piston chamber 38 between the opposing surfaces 46 and 47 of the pistons 34 and 35 will move said pistons apart and close the inner ports 65 and 66.

When the pressure surge occurs in the rightward end of the power cylinder 11, for example, it is immediately and equally conveyed through the by-pass conduit 72 to the ports 65 and 67. The port 65 being closed, fluid enters only through the port 67 into the right hand portion 40 of the piston chamber 38, where it will act against the release surface 54 to urge the piston 35 leftwardly, which opens the port 66. For surges of very short duration and of minor amounts, the leftward movement of the piston 35 in the piston chamber portion 40 may be enough to prevent damage to the power cylinder. However, if such leftward movement of the piston 35 is not enough, then the pressure fluid can flow out of the chamber portion 40 through the inner port 66 and the by-pass conduit 68 into the surge conduit 69 and thence into the leftward end of the power cylinder 11.

Thus, as soon as the surge pressure exceeds a selected relief pressure for the valve 10, the valve operates and the pressure within the rightward end of the power cylinder 11 will immediately drop at least to said relief pressure. The value of said relief pressure, which is normally larger than the $P_1$ pressure, may be controlled both by the tension in the spiral springs 57 and 58 and by the ratio between the areas of the opposing surface and the release surface of each of the pistons 34 and 35. For example, the greater resistance the springs 57 and 58 have to compression, or the greater the area of the release surfaces 53 and 54 with respect to the surfaces 46 and 47, the less pressure will be required of a surge to move the piston 35 leftwardly or the piston 34 rightwardly.

After the cause of the surge within the power cylinder 11 has been abated, the pressure $P_1$ will again move the piston 35 rightwardly against the resistance of the spring 58. The piston 35 will again block the by-pass conduits 68 disconnecting the surge conduit 69 from the surge conduit 72 and, accordingly, terminating the connection of the opposite ends of the power cylinder 11 through the relief valve 10.

The relief valve 10 will operate in a substantially similar manner if the surge occurs in the leftward end of the power cylinder 11, the only difference being that the piston 34 moves rightwardly and permits the pressure fluid to flow from the surge conduit 69 to the surge conduit 72 through the left end of the relief valve 10.

The relief valve 14, being substantially identical to the relief valve 10 in this particular embodiment, will overcome surges in the power cylinder 13 in a manner substantially identical to that discussed with respect to the power cylinder 11 and the relief valve 10.

As a general rule, separate pressure fluid control valves, such as those indicated at 15 and 16 in Figure 1, are more difficult to synchronize and, therefore, are more likely to produce a damaging pressure surge in one of the power cylinders than is the in-line type pressure fluid control valve 17 shown in Figure 2. However, where battle damage is the cause of a surge, such as, for example, where one of the conduits 31a, 32a or 33a is plugged, then the relief valves 10 and 14 may be as valuable as an in-line type of pressure fluid control valve 17 (Figure 2) as with the dual type of pressure fluid control valves 15 and 16 (Figure 1).

As indicated in Figure 3 by the broken lines 74 and 75, it would be possible under some circumstances, where interconnection of similarly pressured sides of the multiple translating devices can be accepted, to use a single relief valve 10 to overcome pressure surges in a plurality of power cylinders. The operation of the relief valve 10 would remain substantially the same as set forth hereinabove.

The value of this invention has herein been illustrated in connection with certain particular types of servo mechanisms and such application has, in fact, been an important area of its utilization. However, it will be appreciated that the employment of such illustrations has been for exemplary purposes only and should not be considered as limiting, for, in view of the foregoing, it will be evident that the valve of this invention may also be applied to a variety of other uses within the scope of the invention and in pursuance of the principles set forth herein, which uses may include other types of servo mechanisms or may include devices which are not servo mechanisms. Particularly, insofar as other servo mechanisms are concerned, with suitably and conventionally modified feed-back means and valving, and the connection of the valves by flexible means to the power cylinders, the servo mechanisms may, without altering the usefulness or applicability of the surge relief valve, also be of the type having a fixed housing and moving piston rod. Likewise, the nature of the feed-back mechanism, whether mechanical, electrical, pressure fluid or other, will not affect the usefulness and applicability of the surge relief valve.

Although a particular, preferred embodiment of our invention has been set forth above for illustrative purposes, it will be understood that variations or modifications thereof, which lie within the scope of such disclosure, are fully contemplated unless specifically stated to the contrary in the appended claims.

We claim:

1. A relief valve for a power translating device having at least two zones for accommodating differential pressures and being connected to a source of pressure fluid, comprising: walled means defining a pair of passageways, each communicating, respectively, with both of said zones; a pair of pistons and means supporting each piston, respectively, in each of said passageways for alternate movement out of, and into, a position obstructing said respective passageways; conduit means connectible to said source for directing said pressure fluid, respectively, against the first axial ends of both of said pistons, the other respective axial ends of said pistons having less surface within said passageways than said first ends; and independently acting means constantly urging said pistons out of obstructing position, one of said pistons so moving when the difference between the fluid pressures against the first end of said piston and the pressure against the other end thereof becomes less than a predetermined amount.

2. A relief valve for a power translating device having at least two zones for accommodating differential pressures and being connected to a source of pressure fluid, comprising: walled means defining a pair of passageways, each communicating, respectively, with both ends of each of said devices; a pair of spaced chambers intersecting said passageways, respectively, one end of each chamber being connectible to said source; a pair of pistons, each disposed, respectively, within one chamber for movement into, and out of, a position obstructing the one of said passageways connected therewith, the surface of each piston nearest to said one end of said chamber being greater than the remote surface thereof within said chamber; and means constantly urging said pistons out of obstructing position when the difference between the pressure against said nearest surfaces and the pressure against said remote surfaces becomes less than a predetermined amount.

3. A relief valve for a power translating device having at least two zones for accommodating differential pressures and being connected to a source of pressure fluid, comprising: means defining a piston chamber; a pair of pistons slidably disposed, respectively, within axially spaced portions of said chamber, the opposing surfaces of said pistons being greater than their remote surfaces within said chamber; resilient means urging said pistons toward each other; a pressure opening in said chamber between said pistons and connectible with said source; a pair of by-pass conduits communicating, respectively, between said portions of said chamber, one end of each by-pass conduit being obstructed by said pistons in response to normal pressure between said pistons and said obstructing being removed when the pressure against the remote surface of one piston exceeds a predetermined ratio with respect to said normal pressure; and a pair of surge conduits connectible, respectively, between said by-pass conduits and said zones.

4. In a pressure relief system for a power cylinder connectible to a source of pressure fluid, the combination comprising: means defining a piston chamber; a pair of pistons slidably disposed, respectively, within axially spaced portions of said chamber, the opposing surfaces of said pistons being greater than their remote surfaces within said chamber; resilient means urging said pistons toward each other; a pressure conduit connecting said source to said chamber at a point between said pistons; a pair of by-pass conduits each communicating, respectively, between said portions of said chamber, one end of each by-pass conduit being obstructed, respectively, by said pistons when the pressure against said remote surfaces is less than a predetermined amount; and a pair of surge conduits respectively connecting said by-pass conduits to the opposite ends of said power cylinder.

5. In a pressure relief system for a power cylinder connectible to a source of pressure fluid, the combination comprising: wall means defining an elongated piston chamber; a pair of pistons slidably disposed, respectively, within first and second axially spaced portions of said chamber, the facing axial ends of said pistons being of greater area than their remote axial ends within said chamber; a pressure conduit connecting said source to said chamber at a point between said pistons; resilient means urging said pistons toward each other; a pair of surge conduits, respectively, connecting the opposite ends of said power cylinder with said portions of said chamber, said surge conduits being unobstructed by said pistons in any position thereof; a pair of by-pass conduits connecting said surge conduits, respectively, to said opposite portions of said chamber, said by-pass conduits being obstructed by said pistons when the maximum pressure within said power cylinder is less than a predetermined amount.

6. In a pressure relief system for a power cylinder connectible to a source of pressure fluid, the combination comprising: wall means defining an elongated piston chamber; a pair of pistons slidably disposed, respectively, within first and second axially spaced portions of said chamber, the facing axial ends of said pistons being of greater area than their remote axial ends within said chamber; a pressure conduit connecting said source to said chamber at a point between said pistons; resilient means constantly urging said pistons toward each other; an inner port located within said first and second portions of said chamber, respectively, to be covered and uncovered as said pistons move toward and away from each other; outer ports located in each of said chambers and positioned so that they are never obstructed by said pistons; a by-pass conduit from the inner port of said first portion of said chamber to the outer port of said second portion of said chamber, and a second by-pass conduit from the outer port of said first portion of said chamber to the inner port of said second portion of said chamber; a surge conduit from said first by-pass conduit to one end of said power cylinder and a second surge conduit from said second by-pass conduit to the other end of said power cylinder; said inner ports of both portions of said chamber being covered during normal operation of said power cylinder and being uncovered when the pressure at either side of said power cylinder exceeds a predetermined relationship with respect to the pressure applied from said source, said uncovering of such one inner port providing a by-pass path for pressure fluid from one side of said power cylinder to the other side thereof.

References Cited in the file of this patent

UNITED STATES PATENTS

| | | |
|---|---|---|
| 2,069,214 | Carlson | Feb. 2, 1937 |
| 2,454,551 | Carlson | Nov. 23, 1948 |